United States Patent
Mair et al.

(10) Patent No.: US 11,148,263 B2
(45) Date of Patent: Oct. 19, 2021

(54) CENTERING SLEEVE AND METHOD FOR FASTENING

(71) Applicant: SFS intec Holding AG, Heerbrugg (CH)

(72) Inventors: Roland Mair, Gotzis (AT); Erich Palm, Au (CH)

(73) Assignee: SFS intec Holding AG, Heerbrugg (CH)

( * ) Notice: Subject to any disclaimer, the term of this patent is extended or adjusted under 35 U.S.C. 154(b) by 242 days.

(21) Appl. No.: 16/402,668

(22) Filed: May 3, 2019

(65) Prior Publication Data
US 2019/0337129 A1 Nov. 7, 2019

(30) Foreign Application Priority Data

May 4, 2018 (EP) .................................. 18170723

(51) Int. Cl.
*B25B 23/00* (2006.01)
*E04F 13/08* (2006.01)
*B21D 39/00* (2006.01)
*F16B 41/00* (2006.01)
*F16B 19/02* (2006.01)
*B23B 49/02* (2006.01)

(52) U.S. Cl.
CPC ............ *B25B 23/005* (2013.01); *B21D 39/00* (2013.01); *E04F 13/0832* (2013.01); *B23B 49/02* (2013.01); *E04F 13/0837* (2013.01); *F16B 19/02* (2013.01); *F16B 41/002* (2013.01); *Y10T 29/49963* (2015.01)

(58) Field of Classification Search
CPC .......................... B25B 23/005; E04F 13/0832; E04F 13/0837; B21D 39/00; F16B 41/002; F16B 19/02; B23B 49/02

USPC .......................................................... 411/999
See application file for complete search history.

(56) References Cited

U.S. PATENT DOCUMENTS

| 2003/0108401 A1* | 6/2003 | Agha | F16B 41/002 411/353 |
| 2003/0108402 A1* | 6/2003 | Agha | F16B 43/00 411/353 |
| 2010/0086376 A1* | 4/2010 | McClure | F16B 19/1081 411/71 |

FOREIGN PATENT DOCUMENTS

| CN | 87204250 | 12/1987 |
| FR | 2941271 | 7/2010 |
| WO | 03026823 | 4/2003 |

\* cited by examiner

*Primary Examiner* — Jermie E Cozart
(74) *Attorney, Agent, or Firm* — Volpe Koenig

(57) ABSTRACT

A sleeve (20) for centering fasteners during the assembly of components such as facade elements on the substructure of a building envelope includes a sleeve body (23) and a connection bracket (25). The sleeve body (23) has a plurality of sleeve elements (21, 22) which are grouped around a central center axis A and are spaced apart from each other by gaps running in the sleeve longitudinal direction. At least a first (21) and a second (22) sleeve piece are connected to each other at an axial longitudinal end of the sleeve body (23) by a separable connection bracket (25), preferably the connection bracket is separable via predetermined breaking points. Such a sleeve is used in the construction of facades, wherein it is inserted into a pilot hole of a facade element, the connection bracket is broken off and a fastener is inserted into the sleeve. Driving the fastener centers the fastener in the sleeve and the sleeve is removed from the pilot hole.

10 Claims, 2 Drawing Sheets

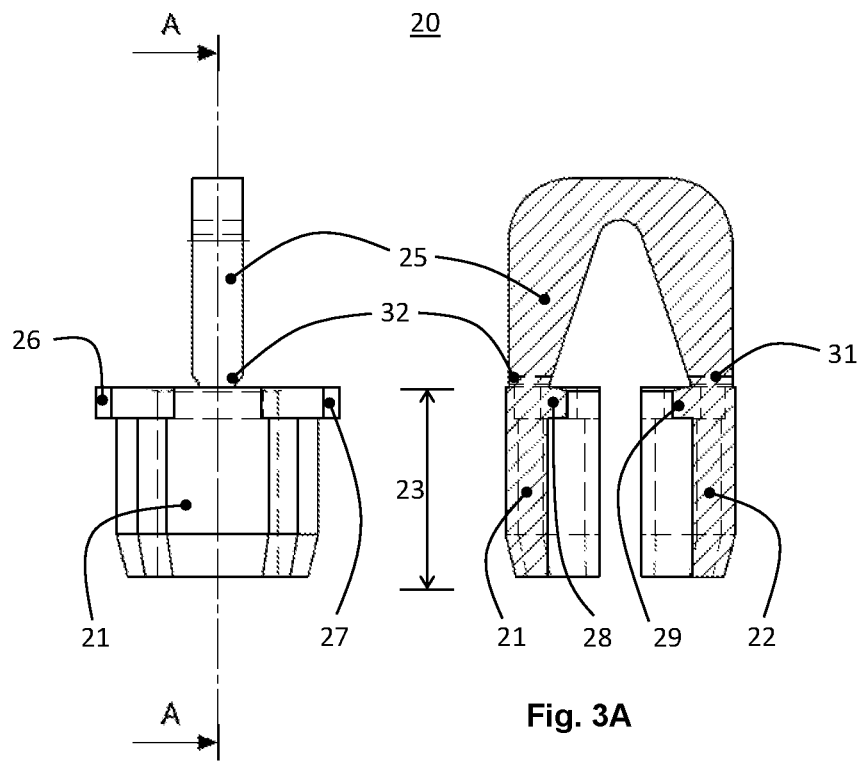
Fig. 3A
Fig. 3B
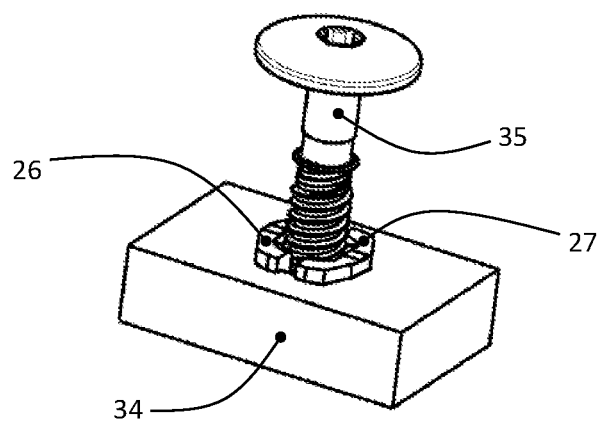
Fig. 4

CENTERING SLEEVE AND METHOD FOR FASTENING

INCORPORATION BY REFERENCE

The following documents are incorporated herein by reference as if fully set forth: European Patent Application No. 18170723.3, filed May 4, 2018.

FIELD OF THE INVENTION

The present invention is concerned with a centering sleeve for the precise positioning of screws when fastening, especially facade panels, to a substructure of a building envelope.

BACKGROUND

Functional building envelopes are being created today in the construction industry, especially in office and commercial buildings, which building envelopes have to meet stringent requirements in terms of safety, transparency, insulation, but also design and maintainability. Especially in demanding architecture, facade elements must be fastened so that the desired overall image is not adversely affected by the fastening technology.

Color-treated plate-shaped components are often used as facade elements with and without surface structures. The materials include fiber cement, wood, HPL (high pressure laminate, paper layers with plastic), plastics, light metal, and composites or laminates of these materials. The thickness of such plates is usually between 4 and 12 mm, depending on the material and size of the element and the type of fastening. The facade elements are usually fastened as the last element of the building envelope on a substructure, often a grid or grate of light metal profiles.

A widely used type of fastening for such facade elements is the visible screw connection, in which the screw heads remain visible as a facade component. Regardless of the type of fastening, however, it must be taken into account that the facade elements and the substructure are subject to different thermal loads and thus expand differently. Tensioning of the facade elements with each other or between facade element and substructure, however, can cause material fatigue.

This problem is often solved so that the facade elements have through holes, the diameter of which is chosen larger than the nominal outer diameter of the thread of the fastening screws. These drill holes in the facade elements can be inserted during their manufacture and therefore need not be drilled on site. Each facade element has play in its fastening plane after assembly. However, the head diameter of the screws must consequently be chosen to be even larger than the diameter of the holes in the facade element.

However, this results in a number of problems during assembly of the facade elements: The oversized hole in the facade element cannot provide guidance to the screw when screwing in. This is all the more critical because the substructure on which the facade elements are is fastened is usually not pre-drilled for cost reasons; self-drilling or self-cutting screws are used instead. However, these require a certain amount of time until the drill bit or thread engages. Tilting or displacing the screw in this phase is easily possible and can jeopardize the intended goal of "fastening with all-round play". A tilted or offset screw can severely disrupt the facade image and prevent its intended goal of absorbing thermal stresses.

PRIOR ART

In the prior art, this assembly problem is solved, for example, so that a sleeve 10 made of elastic material having a substantially tubular body 14, a collar or flange 12 and a bottom 16 is inserted into the through hole of the facade element (see FIG. 1). The outer diameter of the sleeve (without collar) corresponds substantially to the hole diameter in the facade element and the length of the sleeve of the thickness of the facade element. The collar 12 serves as a stop when inserting the sleeve into the pre-drilled facade element and also acts as a stop buffer for the fastening screw used. The bottom of the sleeve can have a center hole 18 which allows centering for a called-for screw. A guiding effect for the screw can thereby be achieved, depending on how large the free inner diameter of the sleeve is. The collar of the sleeve also has a sealing and damping effect in the final assembled state, because the screw head rests on the collar as on a washer.

It has proved to be disadvantageous in the case of sleeves according to FIG. 1 that the bottom can not only be widened by the screwing-in process, but can also be deformed. Also, an entrainment effect of the sleeve 10 on the screw being screwed in can occur, which, especially in sleeves made of thermoplastic, leads to a softening or melting by friction. In the worst case, the sleeve wraps around the screw shaft and is destroyed. It can also happen in very strong screwing that the collar is squeezed or deformed at the stop of the screw head on the facade element and emerges laterally under the screw head. The correction of such an assembly error becomes very expensive, especially when one-way screws were used.

Alternatively, sleeves have been proposed which are used only temporarily for the screwing-in process, but do not remain in the pilot hole. These consist of cylinder wall elements interconnected by releasable webs, which elements together form a sleeve. This sleeve is usually placed on the drill hole and is centered by thin pins or extensions to the drill hole. The sleeve thus represents a temporary drill hole extension that is perpendicular to the base. Mostly through the screw head, the connecting webs of the elements are separated when countersinking the screw and the sleeve falls to the bottom. Sleeves of this type are described, for example, in FR 2 941 271 or WO 03/026823.

The disadvantage is that such sleeves may not hold well in vertical facades in some circumstances and can fall down before setting the screw. An advantage is that no sleeve component remains in the drill hole and that no hardening or breaking up of a sleeve can occur over the facade service life.

SUMMARY

The present invention therefore has the object to avoid these disadvantages of the prior art, in particular to enable safe and easy assembly of facade elements of the type described and to allow a centered and guided assembly of the fastening screw.

This is achieved by a centering aid or centering sleeve or sleeve according to the features of the independent device claim or by an assembly process according to the steps of the method claim. The dependent features describe useful variants and developments of the invention.

In one aspect, a sleeve for centering fasteners in the assembly of components such as facade elements on the substructure of a building envelope is provided having a sleeve body formed of a plurality of sleeve elements which are grouped around a central center axis and spaced apart from each other by gaps running in the sleeve longitudinal direction. At least first and second ones of the sleeve elements are connected to each other at an axial longitudinal end of the sleeve body by a separable connection bracket.

In another aspect, a method for fastening a facade element to the substructure of a building envelope is provided that includes the steps of: inserting the present sleeve in a designated hole of said facade element, so that the flange-like overhangs rest on the surface of the facade element; breaking off the connection bracket along the predetermined breaking points to the sleeve elements; inserting a fastener in the longitudinal opening of the sleeve; driving the fasteners; countersinking the fastener in the substructure, wherein the sleeve achieves a centering in the hole of the facade element and the driver elements lock in the thread grooves of the fastener; ejecting the sleeve elements (21, 22) from the hole of the facade element by driving the fastener; and completion of the fastening wherein no remainder of the sleeve remains in the group screw—facade element—substructure.

The sleeve according to the invention is intended only for assembly of a product to be used only once that stabilizes a fastener at the beginning of the assembly process (centers and guides) and is broken or ejected during further driving in of the fastener and is no longer in the way for the final screwing-in process. The resulting fastening is thus free of sleeve components.

BRIEF DESCRIPTION OF THE DRAWINGS

FIGS. 3A and 3B are side and cross-sectional views of the centering sleeve of FIG. 2.

FIG. 4 is a perspective view of a fastener being installed with the centering sleeve.

DETAILED DESCRIPTION

Figure 1:
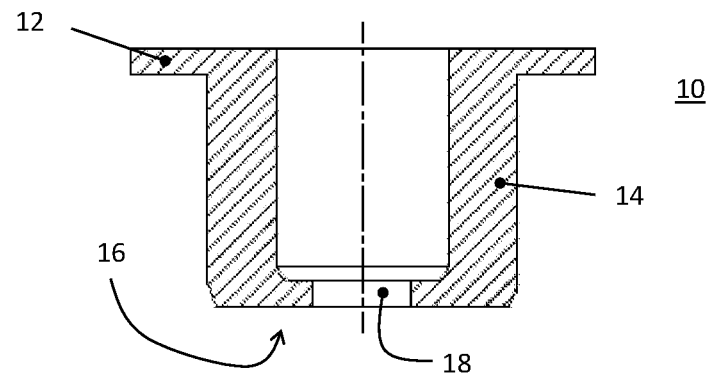
FIG. 1 is a cross-sectional view of a centering sleeve according to the prior art.

FIG. 1 relates to a centering sleeve according to the prior art. A sleeve 10 is shown having a collar or flange 12 and a bottom 16 in cross-section, not to scale. The substantially tubular body 14 is usually made of an elastic material. The illustrated center hole 18 is optional and serves to guide a fastener during assembly.

Figure 2:
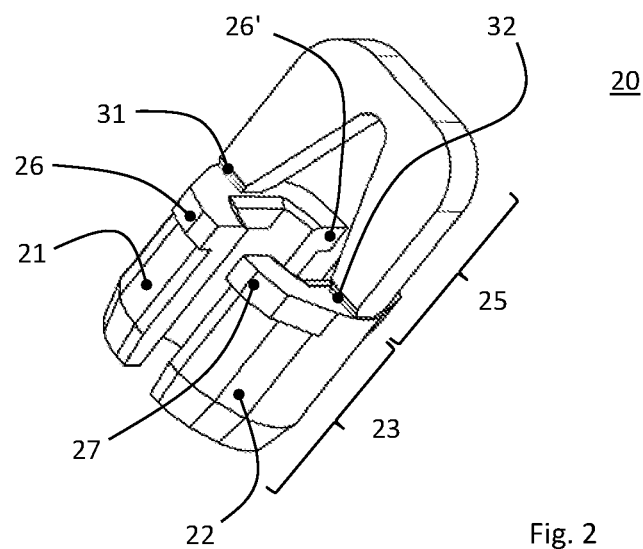
FIG. 2 is a perspective view of a first embodiment of the present centering sleeve.

FIG. 2 shows the perspective view of a centering sleeve according to the invention in a preferred embodiment. The sleeve 20 is divided into two basic elements, the sleeve body 23 and the connection bracket 25. The sleeve body 23 here consists of two sleeve elements 21, 22, which are connected to the connection bracket 25 via predetermined breaking points 31, 32. The overhangs 26, 27 acting as a stop when inserted into the pilot hole can likewise be seen. These are not only designed here as annular sections, indicated by 26 and 26'.

FIGS. 3A and 3B show a centering sleeve 20 according to the invention in two side views rotated by 90°. The lower part in the figures, which is designated by 23, marks again the sleeve body; the connection bracket 25 is connected to the sleeve elements 21, 22 via predetermined breaking points 31, 32. Overhangs 26, 27 can be seen in the side view on the left, while the section on the right shows the driver elements 28, 29 attached to the inside. These are simply designed here as horizontal brackets in the form of a secant and thereby also have a stiffening effect on the sleeve element.

FIG. 4 shows an assembly situation. The facade element 34 has a pilot hole, in which a centering sleeve has been inserted, so that the flange-like overhangs 26, 27 rest on the surface of the facade element. The connection bracket 25 is missing, it was broken off and thus makes room for the fastener 35. The snapshot shows the sleeve still in the countersunk state, before the conveying out of the countersunk sleeve elements begins by driving the fastener.

Such a sleeve 20 thus serves for the centering of fasteners (screws) in the assembly of components such as facade elements on the substructure of a building envelope. The sleeve 20 substantially comprises two components for this purpose: The sleeve body 23 and a connection bracket 25. The sleeve body is composed of a plurality of sleeve elements 21, 22 which are grouped around a central center axis A and are spaced apart from each other by gaps running in the sleeve longitudinal direction. These gaps are preferably designed parallel to the axis A, but could also be designed, for example, in spiral form.

A sleeve according to technical definition is usually a hollow cylinder having a central passage opening running in the longitudinal direction. The central center or longitudinal axis is designated by A. In the present case, the wall of the hollow cylinder is constructed of segments or elements, which are referred to as sleeve pieces or elements 21, 22. The gaps are thus breakthroughs, preferably complete breakthroughs between the wall elements. 2 hollow cylinder wall elements/sleeve pieces are preferably provided. These two sleeve pieces 21, 22 are connected to each other at an axial longitudinal end of the sleeve body 23 by the separable connecting bracket 25.

In a preferred variant, the two sleeve pieces (before use) are exclusively connected to each another via the connection bracket 25. In other words, there is no material connection between the sleeve pieces other than the bracket It is conceivable to attach connecting webs directly between the sleeve pieces 21, 22, but in practice this is not mandatory.

In one embodiment, the sleeve 20 has a radially outward flange-like overhang 26, 27 respectively on the first 21 and second 22 sleeve piece. This overhang must be at least dimensioned so large that the function of a stop flange can be safely met. In particular, the overhang is intended as a boundary when inserting the sleeve 20 in the pre-drilled opening of the facade element. This will prevent the sleeve from being inserted too deeply into the pilot hole.

It is advantageous to arrange the flange-like overhangs 26, 27 at an axial end of the sleeve body 23, that is, at the end of the sleeve body 23 which lies opposite the insertion end.

In a particularly advantageous embodiment, the sleeve 20 or the first 21 and the second 22 sleeve piece each have at least one driver element 28, 29. This is realized as a radially inward projection. Technically, the driver element 28, 29 can be designed as a cam, web, as a flange-like ring section or as a pin-shaped cylinder. As described in the method part, this driver element engages in the thread of a fastener 35 introduced during assembly and is moved by the screwing-in process in the direction of the fastener head. The driver element is thus designed so that it can engage geometrically in the thread, locks in or is adapted or formed by the thread so that the thread can exert a force acting parallel to the fastener longitudinal axis when screwing the fastener.

In a further embodiment, the connection bracket 25 has a predetermined breaking point 31, 32 each at the transition to the first and second sleeve element 21, 22. The connection bracket 25 is thereby easier to separate, as explained later in the method part.

As mentioned in the introduction, the sleeve according to the invention is a component for one-time use. This requires, on the one hand, a cost-effective production without complex manufacturing steps and, on the other hand, the avoidance of an enduring environmental impact. In order to address the first point, the sleeve according to the invention is preferably designed as an injection molding element or compression molding element. The component can thus be produced with little effort. In this case, an injection-moldable plastic, in particular a biodegradable plastic, is preferably used as the material. This can remain on the assembly site and is degraded in the ground or can be disposed of without special measures.

Alternatively, a sleeve of bonded paper fibers, vegetable fibers, or other composites can be made, for example, by pressing and subsequent machine drying.

The assembly method for fastening a facade element 34 to the substructure of a building envelope can be realized with the following steps:

A sleeve according to the invention as described above is introduced into a hole of a facade element 34 provided therefor, so that the flange-like overhangs 26, 27 rest on the surface of the facade element 34. The insertion can be done manually or mechanically, the connection bracket 25 is used as an insertion aid.

The connection bracket can be formed very simply as shown in FIGS. 2, 3A and 3B, but could also have further elements that allow a machine setting. The bracket can also serve as a connecting link to other sleeves/brackets, in the manner of a magazine strip.

After insertion of the sleeve, the connection bracket 25 is broken off along the predetermined breaking points 31, 32 to the sleeve elements 21, 22, for example, by kinking or repeated reciprocating movement (shearing) or twisting.

Subsequently, the bracket is no longer a fastener in the way. As described, the sleeve body 23 having the sleeve elements 21, 22 can be designed so that it consists of wall elements that are no longer connected to each other after breaking off the bracket. The two sleeve elements thus lie in the pilot hole. It has been shown that this does not matter in practice, the existing friction between sleeve elements and pilot hole inner wall is sufficient for temporary fixation of the sleeve elements.

Alternatively, the sleeve elements 21, 22 can be connected to each other with simple, thin webs, which form predetermined breaking points. These predetermined breaking points are then broken when setting the fastener later.

In the next step, a fastener, usually a screw or a suitable technical equivalent, is inserted into the longitudinal opening of the sleeve. As a result, the two sleeve elements 21, 22 are forced again to the inner wall of the hole. The flange-like overhangs 26, 27 prevent the sleeve elements from penetrating deeper into the pilot hole than necessary. The inwardly cantilevered driver elements 28, 29 engage or form in the thread of the fastener.

The driving of the fastener begins in the next method step. This results in the interaction of the stop flange (overhangs 26, 27) with the driver elements 28, 29. As long as the screw tip has not reached the substructure, the pressure exerted by the installer via the fastener on the sleeve elements will stabilize the sleeve in the pilot hole and the centering effect of the sleeve unfolds. As soon as the drilling or centering point of the fastener reaches the substructure, the sleeve is relieved, because the screw tip grooves into the substructure and the majority of the pressure passes over to the tip. Because of the driver elements 28, 29, which are in engagement with the thread spiral, the sleeve elements are, however, conveyed out in the direction of the screw head, that is, from the pilot hole, and fall to the ground. The short amount of time in which the advancing stops while the fastener is in rotation until the drill/displacer/centering tip engages the substructure is sufficient to guarantee the centering effect and to bring into effect complete ejection of the sleeve elements and thus to complete the fastening. The fastener is set optimally and has the predefined clearance in the pilot hole of the facade element.

The necessary dimensioning of the sleeve is evident through the described functionality. The outer diameter must be selected so that the sleeve can be easily inserted into the pilot hole of the facade element. The inner diameter of the sleeve (in the uninstalled state, that is, with connection bracket 25) will be chosen so that it is slightly larger than the nominal diameter of the fastener. The projecting mass of the inwardly directed driver elements is chosen so that they can, on the one hand, securely engage in the thread, but cannot be sheared off when inserting the fastener. A person skilled in the art will be able to design the dimensions depending on the material.

The axial length of the sleeve body 23 will correspond at most to the depth of the pilot hole or the thickness of the facade element to be fastened. It can also, however, be designed shorter and thus applied for differently dimensioned facade elements. The previously described interaction when setting the fastener in the substructure allows this lay out. A further criterion for the length of the sleeve body 23 is, of course, the remaining distance between the underside of the fastener head and the surface of the facade element, viewed at the moment when the tip of the fastener meets the substructure. Following the logic of the setting process, the sleeve is conveyed out of the drill hole, while at the same time, the head of the fastener is lowered in the direction of the facade panel element. The sleeve length, or the length of the sleeve body 23, must be chosen so that there is no jamming of the sleeve elements 21, 22 between facade element and the underside of the fastener head. The thread of the fastener, the material pairing of sleeve and facade element and various other factors play a role in the lay out. Simple experiments, however, can find suitable dimensions within the limits described here.

In a well-functioning combination, the outer diameter of the sleeve (without flange) is about 10 mm, the flange protrudes about 0.5 mm. The length of the sleeve body 23 is about 7.5 mm.

The invention claimed is:

1. A sleeve (20) for centering fasteners during assembly of components, the sleeve comprising:
   a sleeve body (23) formed of a plurality of sleeve elements (21, 22) which are grouped around a central center axis (A) and spaced apart from each other by gaps running in a sleeve longitudinal direction;
   a separable connection bracket (25) that connects at least first (21) and second (22) ones of the sleeve elements to each other at an axial longitudinal end of the sleeve body (23): and
   the first sleeve element (21) and the second sleeve element (22) each have at least one driver element (28, 29) formed as a radially inwardly directed projection that extends into a longitudinal opening of the sleeve.

2. The sleeve (20) according to claim 1, wherein the connection between the first (21) and the second (22) sleeve elements is exclusively made by the connection bracket (25) before use of the sleeve.

3. The sleeve (20) according to claim 1, wherein the first (21) and the second (22) sleeve elements each have a radially outward flange-shaped overhang (26, 27).

4. The sleeve (20) according to claim 3, wherein the flange-shaped overhangs (26, 27) are arranged at the axial longitudinal end of the sleeve body (23).

5. The sleeve (20) according to claim 1, wherein the driver element (28, 29) comprises a cam, a web, a flange ring section or a pin-shaped cylinder.

6. The sleeve (20) according to claim 1, wherein the sleeve (20) is an injection molded element or compression molded element.

7. The sleeve (20) according to claim 1, wherein the sleeve (20) is formed of at least one of a plastic, a biodegradable plastic, bonded paper fibers, vegetable fibers, or composite materials.

8. The sleeve of claim 1, wherein the sleeve is adapted for assembly of a facade element to the substructure of a building envelope.

9. A sleeve (20) for centering fasteners during assembly of components, the sleeve comprising:
   a sleeve body (23) formed of a plurality of sleeve elements (21, 22) which are grouped around a central center axis (A) and spaced apart from each other by gaps running in a sleeve longitudinal direction; and
   a separable connection bracket (25) that connects at least first (21) and second (22) ones of the sleeve elements to each other at an axial longitudinal end of the sleeve body (23);
   wherein the connection bracket (25) has a predetermined breaking point (31, 32) each at the transition to the first and second sleeve element (21, 22).

10. A method for fastening a facade element to a substructure of a building envelope, comprising the following steps:
   a) inserting a sleeve (20), including a sleeve body (23) formed of a plurality of sleeve elements (21, 22) which are grouped around a central center axis (A) and spaced apart from each other by gaps running in a sleeve longitudinal direction and a separable connection bracket (25) that connects at least first (21) and second (22) ones of the sleeve elements to each other at an axial longitudinal end of the sleeve body (23), in a hole of said facade element, with flange-shaped overhangs (26, 27) of the first and the second sleeve elements resting on a surface of the facade element,
   b) breaking off the connection bracket (25) along predetermined breaking points (31, 32) to the sleeve elements (21, 22),
   c) inserting a fastener in a longitudinal opening of the sleeve,
   d) driving the fastener,
   e) countersinking the fastener in the substructure, wherein the sleeve (20) achieves a centering in the hole of the facade element and driver elements (28, 29) of the first and second sleeve elements lock in the thread grooves of the fastener,
   f) ejecting the sleeve elements (21, 22) from the hole of the facade element by driving the fastener, and
   g) completing the fastening wherein no remainder of the sleeve (20) remains in a completed fastener-facade—element substructure combination.

\* \* \* \* \*